(12) United States Patent
Woo et al.

(10) Patent No.: US 7,457,297 B2
(45) Date of Patent: Nov. 25, 2008

(54) METHODS AND APPARATUS FOR DIFFERENTIATED SERVICES OVER A PACKET-BASED NETWORK

(75) Inventors: Leon K. Woo, Concord, MA (US);
Robert Ryan, Marlboro, MA (US);
John B. Crowther, Nashua, NH (US)

(73) Assignee: Enterasys Networks, Inc., Andover, MA (US)

( * ) Notice: Subject to any disclaimer, the term of this patent is extended or adjusted under 35 U.S.C. 154(b) by 988 days.

(21) Appl. No.: 10/298,243

(22) Filed: Nov. 15, 2002

(65) Prior Publication Data

US 2003/0112817 A1   Jun. 19, 2003

Related U.S. Application Data

(60) Provisional application No. 60/339,073, filed on Nov. 16, 2001.

(51) Int. Cl.
 *H04L 12/28* (2006.01)
 *G01R 31/08* (2006.01)
(52) U.S. Cl. ............ 370/395.41; 370/419; 370/395.42; 370/413; 370/235

(58) Field of Classification Search ............... 370/352, 370/400, 389, 395.2, 395.21, 395.4, 395.41, 370/395.42, 395.5, 410, 408, 412, 413, 415, 370/419, 420, 235, 229, 230, 231
See application file for complete search history.

(56) References Cited

U.S. PATENT DOCUMENTS

| | | | | |
|---|---|---|---|---|
| 5,533,020 | A * | 7/1996 | Byrn et al. | 370/395.4 |
| 6,047,000 | A * | 4/2000 | Tsang et al. | 370/412 |
| 6,570,883 | B1 * | 5/2003 | Wong | 370/412 |
| 7,158,528 | B2 * | 1/2007 | Dell et al. | 370/416 |

\* cited by examiner

*Primary Examiner*—Hanh Nguyen
(74) *Attorney, Agent, or Firm*—Lowrie, Lando & Anastasi, LLP

(57) ABSTRACT

Methods and apparatus for the provision of differentiated services in a packet-based network may be provided in a communications device such as a switch or router having input ports and output ports. Each output port is associated with a set of configurable queues that store incoming data packets from one or more input ports. A scheduling mechanism retrieves data packets from individual queues in accord with a specified configuration, providing both pure priority and proportionate de-queuing to achieve a guaranteed QoS over a connectionless network.

37 Claims, 8 Drawing Sheets

METHODS AND APPARATUS FOR DIFFERENTIATED SERVICES OVER A PACKET-BASED NETWORK

CROSS-REFERENCE TO RELATED APPLICATIONS

The present application claims the benefit of provisional application No. 60/339,073, filed on Nov. 16, 2001, the entire disclosure of which is incorporated by reference as if set forth in its entirety herein.

FIELD OF THE INVENTION

The invention relates generally to packet-based networks and, in particular, to the provision of differentiated services over a packet-based network.

BACKGROUND OF THE INVENTION

A communications network may be characterized as "connection-oriented" or "connectionless." A connection-oriented network is conceptually similar to a telephone network. First, a source entity opens a connection using a call-setup protocol to create a circuit with a destination entity. Using the connection, the source entity transmits data to the destination entity, which receives the data in the order it is transmitted. The bandwidth associated with this connection is reserved while the connection is open and is therefore unavailable for other connections, even if the circuit is idle.

Due to this bandwidth reservation requirement, connection-oriented networks are ill-suited to carry bursty data communications. The bandwidth of a connection is wasted when it idles between bursts of communications and, when the network is congested, idle bandwidth reserved for other connections typically cannot be commandeered to alleviate the congestion.

In contrast, the transmission of data over a connectionless network is analogous to sending parcels through the mail: each packet of data on the network is labeled with a destination address and processed independently of any other packet sent across the network. The bandwidth associated with a connectionless link is not reserved and may be allocated to other entities on a first-come, first-served basis. This routing model permits the efficient use of network resources since bursty data traffic only uses bandwidth as needed and, in congestion scenarios, packets may be dropped if network resources (such as buffer memory) become full. The Internet carries data according to the connectionless model using a packet-based protocol called "internet protocol" (IP).

A problem arises when an application requires data transfer with a guaranteed minimum quality-of-service (QoS) using a connectionless network such as the Internet or a private packet-based network. For example, a source entity transmitting data associated with voice, videoconferencing, or other real-time communications applications may require that all the data packets it sends arrive in order in a relatively-constant, predetermined time frame. In this case, the same routing flexibility that permits the efficient use of network resources on the connectionless network also hinders the provision of a guaranteed QoS, as packets sent over the network may arrive out of order, may arrive late, or not arrive at all. Therefore, there is a need for techniques that facilitate the provision of a guaranteed QoS over a typical connectionless network.

SUMMARY OF THE INVENTION

The present invention provides a communication device with queues whose transmission behavior may be controlled by the specification of one or more parameters. The specification of parameters permits the provision of a guaranteed QoS over a packet-based network.

In one aspect, a communications device for use on a communications network is capable of transferring data packets received at an input port to an output port. The device includes first and second configurable queues, both queues in communication with the input port and the output port. Each of the first and second queues in configurable to independently operate in a fairness-based mode or a priority-based mode. A fairness-based queue is serviced when egress bandwidth is available, while a priority-based queue with packets for dequeuing is serviced before a fairness-based queue when priority-based mode dequeuing constraints are met. The communications device may typically include a dequeuing component in communication with the first and second queues and the output port. The communications device may additionally include various registers, memories, counters, or vectors. The values specified in the registers, etc. control the dequeuing and transmission behavior of the queues.

The device may include one or more credit counters for tracking credits associated with a queue, such that the associated queue is ineligible for dequeuing unless the associated credit counter has accumulated sufficient credits for service. The credit counters may, in turn, be associated with enable bits and, optionally, increment registers. Specifying the value in an enable bit permits or prohibits the incrementing of its associated credit counter, while the value specified in an increment register controls the amount by which the credit counter is incremented. The device may also associate one or more queues with one or more of a rate value register and a burst size register. The value specified in the rate value register controls how often the credit counter is incremented, while the value in the burst size register specifies a maximum value for the credit counter.

In one embodiment, the device includes one or more credit allocation registers for the donation of credits to another queue when the donor queue's credit counter has reached its maximum value. Repeated entries in the credit allocation register permit disproportionate donations to one recipient queue in lieu of another recipient queue. In another embodiment, the device may also include a donation register indicative of the credits received from a donor queue.

In still another embodiment, the device includes one or more of a priority mask register, a dequeuing vector, and a vector register. The bit settings in the priority mask register specify whether a queue operates in a priority-based mode or a fairness-based mode. The dequeuing vector contains entries that control the dequeuing of fairness-based queues; the vector may include repeated entries to proportionately weight the dequeuing of one queue relative to another queue. The value in the vector register controls the maximum amount of data that may be provided by a fairness-based queue to its associated output port.

In another aspect, a method for routing data packets using a telecommunication device provides a first configurable queue and a second configurable queue, both queues in communication with an input port and output port, and both queues independently configurable to operate in one of a fairness-based mode and a priority-based mode. A packet is received at the input port, classified as subject to either fairness-based handling or priority-based handling, assigned to an appropriate queue using the result of the classification, and provided to the output port by servicing the queue in either a fairness-based mode or a priority-based mode, as configured. The received packet may optionally be classified prior to receipt at the input port as subject to either fairness-based handling or priority-based handling. In one embodiment, each queue is associated with a quality-of-service level.

In one embodiment, a credit counter associated with a queue is incremented and then compared with a predetermined value. If the post-increment value in the counter exceeds the predetermined value, then the packet is provided to the output port. Additionally, if the post-increment value in the counter exceeds the predetermined value, then the surplus of the post-increment value over the predetermined value may be applied to increment another counter. Alternately, the increment value itself may be applied to increment the other counter. The identity of the recipient counter may be determined by consulting the values stored in a credit allocation register.

In another embodiment, the servicing of a particular queue may be controlled by values specified in a priority mask register associated with the output port. If a queue is designated as operating in a priority-based mode, then it is serviced ahead of a fairness-based queue until the priority-based queue is emptied of packets or a predetermined transmission criteria is satisfied. This embodiment may also implement the credit donation features described above.

In still another aspect, a method for routing data packets using a telecommunications device selects one of a plurality of queues—each of the queue independently operating in one of a priority-based and a fairness-based mode. Packets are dequeued from one of the priority-based queues until a priority-based condition is satisfied, whereupon a packet is dequeued from one of the fairness-based queues. Packets are dequeued from the fairness-based queue as long as the priority-based condition is satisfied, whereupon packets are dequeued from the priority-based queue. Typical conditions include the absence of any remaining packets in any queue operating in priority-based mode, dequeuing packets from a priority-based queue in excess of a predetermined value, maintaining the size or quantity of packets in a priority-based queue below a predetermined value, maintaining the size or quantity of packets in a fairness-based queue below a predetermined value, etc.

In yet another aspect, a method for routing data packets using a telecommunications device provides a first and second configurable queue in communication with an input port and an output port. Each of the first and second queues is independently configurable to operate in one of a fairness-based mode and a priority-based mode. A first credit counter associated with the first queue is incremented, the post-incremented value is compared to a first predetermined value, and then a second credit counter is incremented in response to the result of the comparison. The amount by which the second credit counter is incremented may be, e.g., the excess of the post-incremented value over the predetermined value or the amount used to increment the first counter. The first credit counter may also be decremented if it exceeds the predetermined value. The identity of the second credit counter may be determined by consulting the entries in a credit allocation register.

The foregoing and other features and advantages of the present invention will be made more apparent from the description, drawings, and claims that follow.

BRIEF DESCRIPTION OF THE DRAWINGS

The advantages of the invention may be better understood by referring to the following description taken in conjunction with the accompanying drawings in which.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

In brief overview, the present invention provides methods and apparatus to permit the provision of differentiated services in a packet-based network. In one embodiment, methods and apparatus relating to the present invention may be provided in a communications device such as a switch or router having input ports and output ports. Each output port is associated with a set of configurable queues that store incoming data packets from one or more input ports. A scheduling mechanism retrieves data packets from individual queues in accord with a specified configuration, providing both pure priority and proportionate de-queuing to achieve a guaranteed QoS over a connectionless network.

One suitable communications device is presented in pending U.S. patent application Ser. No. 09/684,763, assigned to Tenor Networks, Inc., the entire contents of which are incorporated herein by reference. This device has multi-level memory buffering, with the aggregate depth of each successive memory buffer layer in the device equaling or exceeding the aggregate depth of the preceding buffer layer. Also, the aggregate bandwidth of the first buffer layer in the device typically equals or exceeds the aggregate bandwidth of all the connections to the input ports on the device.

The following discussion utilizes this device for illustrative purposes, but it is to be understood that the scope of the present invention as defined by the claims is not limited to this particular device. For example, another suitable communications device has single-level memory buffering but sufficient memory bandwidth to implement the configurable dequeuing of the present invention. Still another suitable communications device is input-buffered, with various configurable queues associated with the input ports and output ports of the communications device.

Figure 1A:
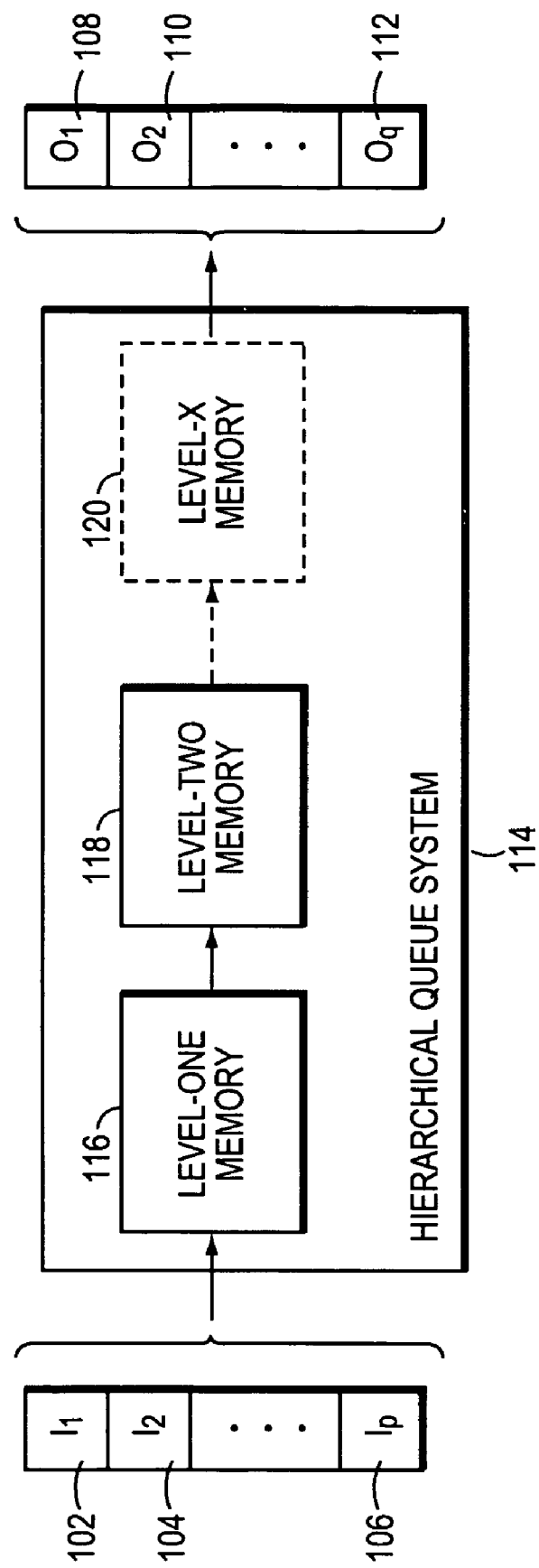
FIG. 1A schematically illustrates a hierarchical queue system for use with an embodiment of the present invention.

FIG. 1A presents a suitable communications device having input ports (generally $I_p$) 102, 104, and 106 and output ports (generally $O_q$) 108, 110, and 112. The device incorporates a hierarchical queue system 114 to transfer packets received over a communication network from the input ports 102, 104 and 106 to the output ports 108, 110, and 112. The hierarchical queue system 114 buffers the received packets in a plurality of memory elements, such as a level-one memory 116, a level-two memory 118, and (generally) a level-X memory 120. This hierarchical queue system 114 may also be implemented in the network interface card (NIC) of a communication device, in a wide variety of communication devices (e.g., switches or routers), in a shared memory accessible to one or more communication devices, etc.

For the communication device to process traffic at the aggregate network rate, the level-one memory 116 must be fast enough to buffer at line rate the aggregate traffic of all of the input ports 102, 104 and 106 without loss. Level-one memory may be constructed of "wide" memories, where the memory width is defined as the number of bits that may be stored in parallel in the memory in one clock cycle. Given a particular clock rate value for a memory, the memory bandwidth may be increased by making the memory width wider. However, due to practical limits on memory storage density, making a memory wider typically necessitates that the memory also becomes shallower. The resulting reduction in memory depth may be addressed by adding a plurality of level-two memories 118 whose aggregate bandwidth equals or exceeds the bandwidth of the level-one memory 116. Although improvements in memory technology may permit the support of a particular packet bandwidth without sacrificing packet-buffer depth, the problem may re-emerge as the communications device is scaled to address higher packet-buffer bandwidths.

To achieve scaling without requiring unrealistic increases in memory performance, the hierarchical queue system 114 incorporates additional memory levels 118 and 120 that are organized according to successively deeper packet-buffer depths (i.e., capable of storing more bytes) and exhibit packet-buffer bandwidths equal to or greater than that of the level-one memory 116, in aggregate. The level-two memory 118 and level-X memory 120 essentially compensate for the reduction in packet-buffer depth in the level-one memory 116 through organization into deeper packet-buffer depths. Although the type of memory used in each memory level 116, 118, and 120 of the hierarchical queue system 114 may exhibit substantially similar performance characteristics (while being organized differently), the offsetting effects of the level-two memory 118 and level-X memory 120 permit the use of denser memory types (i.e., having a greater packet-buffer depth) for the lower level memories 118 and 120 that to achieve cost savings.

Figure 1B:
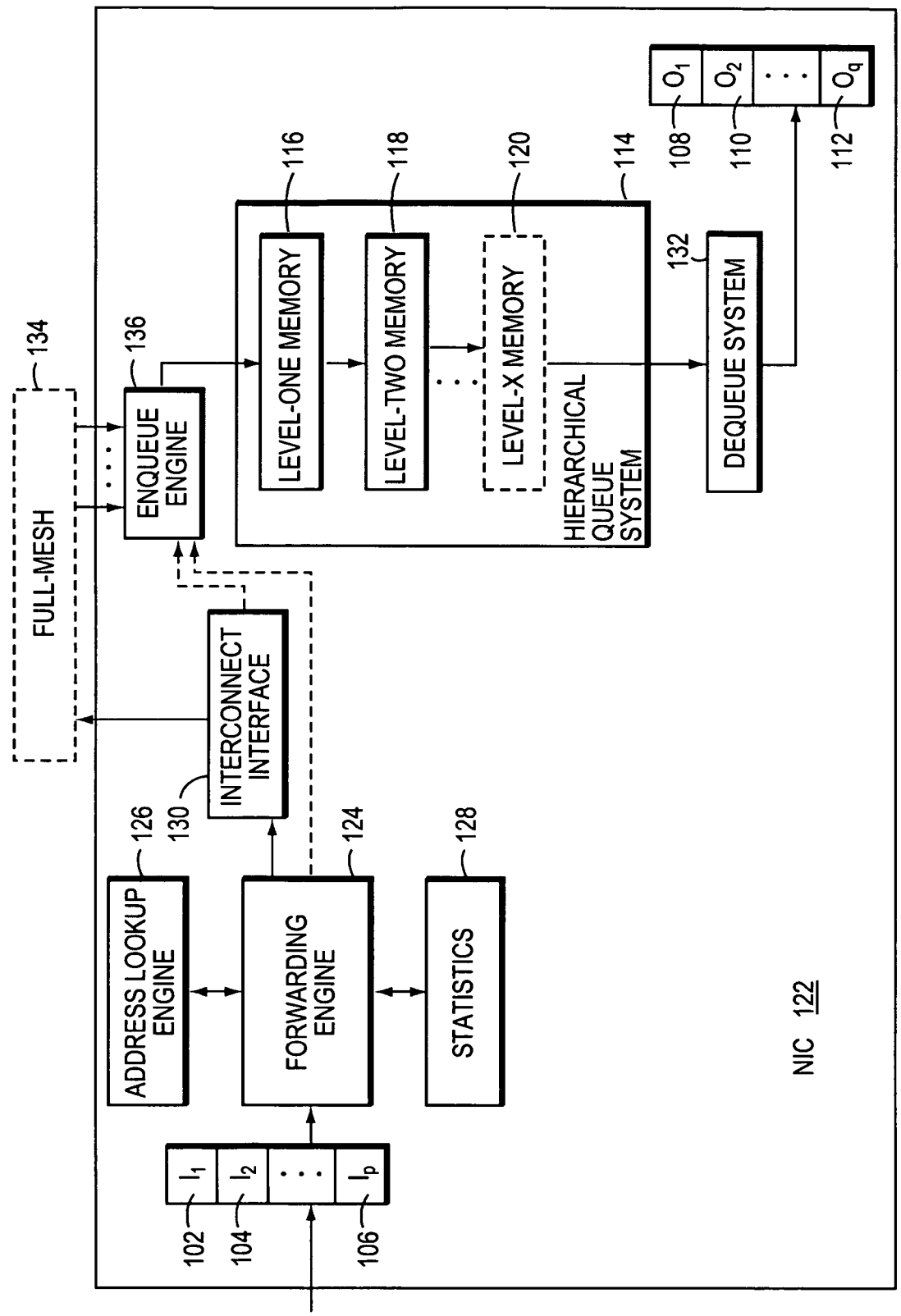
FIG. 1B schematically illustrates several components in a network interface card may be arranged and operated in accord with the present invention.
Figure 2:
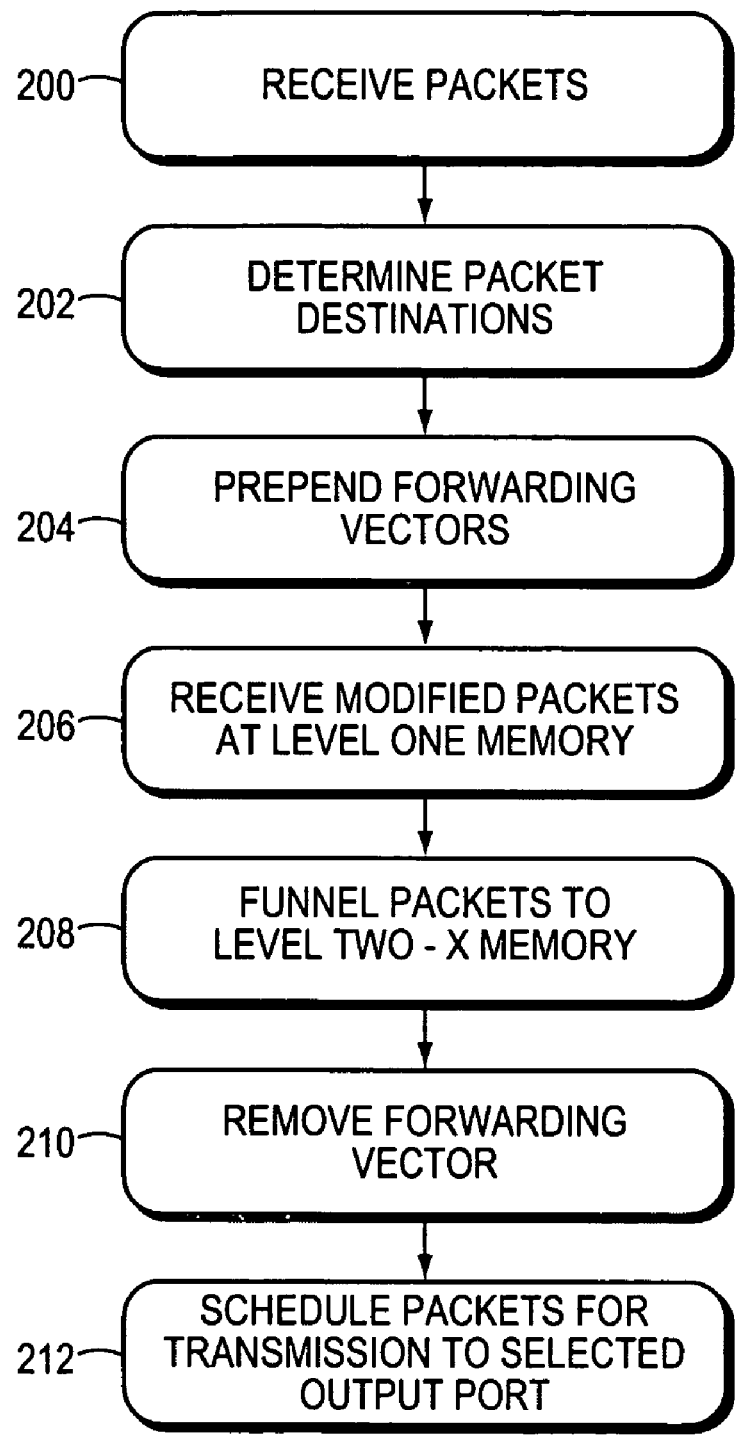
FIG. 2 provides a flow diagram of the steps performed when operating the network interface card of FIG. 1B, in accordance with one embodiment of the present invention.

With reference to FIGS. 1B and 2, a NIC 122 embodying aspects of the present invention includes input ports 102, 104, 106, a packet processing or forwarding engine 124, an address lookup engine (ALE) 126, a statistics module 128, an interconnect interface 130, the hierarchical queue system 114, a dequeue system 132, and output ports 108, 110 and 112. The NIC 122 receives packets from a packet-based communication network at input ports 102, 104, and 106 (FIG. 2, Step 200). The forwarding engine 124, together with the ALE 126, determine the destination output ports of the packets by looking up the appropriate output ports 108, 110, and 112 associated with that destination (FIG. 2, Step 202), and prepending forwarding vectors onto the packets (FIG. 2, Step 204) to aid in routing them to the appropriate output ports.

The modified packets are then routed to the full-mesh interconnect 134 via the interconnect interface 130 and are subsequently delivered to the hierarchical queue system 114. The hierarchical queue system 114 of the NIC 122 normally receives the modified packets via the full-mesh interconnect 134 so that it can funnel packets originally received at the input ports of any NIC installed within the communication device, including the packets received by the input ports 102, 104 and 106 of its own NIC 122, to one or more of the output ports 108, 110 and 112 of its own NIC 122. In another embodiment, packets received at input ports 102, 104 and 106 are transferred directly to the hierarchical queue system 114 by the forwarding engine 124 and bypass the interconnect interface 130 and full-mesh interconnect 134 altogether. In yet another embodiment, the forwarding engine 124 transfers the packets to the interconnect interface 130, which then directly forwards the packets to the hierarchical queue system 114, thus bypassing the full-mesh interconnect 134.

Regardless of the physical path followed, the modified packets are received at a first-level memory 116 of the hierarchical queue system 114 (FIG. 2, Step 206). In one embodiment, sufficient memory bandwidth permits the sophisticated dequeuing mechanisms (discussed in greater detail below) to be implemented using only the first-level memory 116. In another embodiment, the packets in the first-level memory 116 are funneled to a second-level memory 118 and to subsequent X-level memories 120 (FIG. 2, Step 208) corresponding to memory elements organized into increasingly deeper queue depths as described below. The funneling/buffering process implemented in the hierarchical queue system 114 groups the packets in the lowest level of memory of the hierarchical queue system 114 into queues associated with particular output ports 108, 110 and 112. Packets are then transferred to the dequeue system 132 where the forwarding vectors of each packet are removed (FIG. 2, Step 210) and the packets are scheduled for transmission to the selected output ports 108, 110, and 112 (FIG. 2, Step 212), as discussed in greater detail below. The packets are then transmitted from the selected output ports 108, 110 and 112 to a communication network such as a local-area network (LAN), metropolitan-area network (MAN), or wide-area network (WAN).

More particularly and as an illustrative embodiment, when a packet is received at input port 102, a forwarding engine 124 associated with the input port 102 is selected. The selected forwarding engine parses the received packet header. The forwarding engine 124 processes the packet header by checking the integrity of the packet header, verifying its checksum, accessing a statistics module 128 to provide statistics that are used to report the processing activity involving this packet header to modules external to the selected forwarding engine, and communicating with the ALE 126 to obtain routing information for one of the output ports 108, 110 and 112 associated with the destination of the packet. Additional network specific (e.g., IP, ATM, Frame Relay, HDLC, TDM) packet processing may be done at this time. At the conclusion of the forwarding engine activity, the selected forwarding engine 124 may modify the packet header to include routing information (e.g., by prepending a forwarding vector to the packet header) that designates a particular output port of the NIC 122. The modified packet header is then written to a buffer of the forwarding engine 124 where it is subsequently routed to the hierarchical queue system 114 as discussed above.

Figure 3:
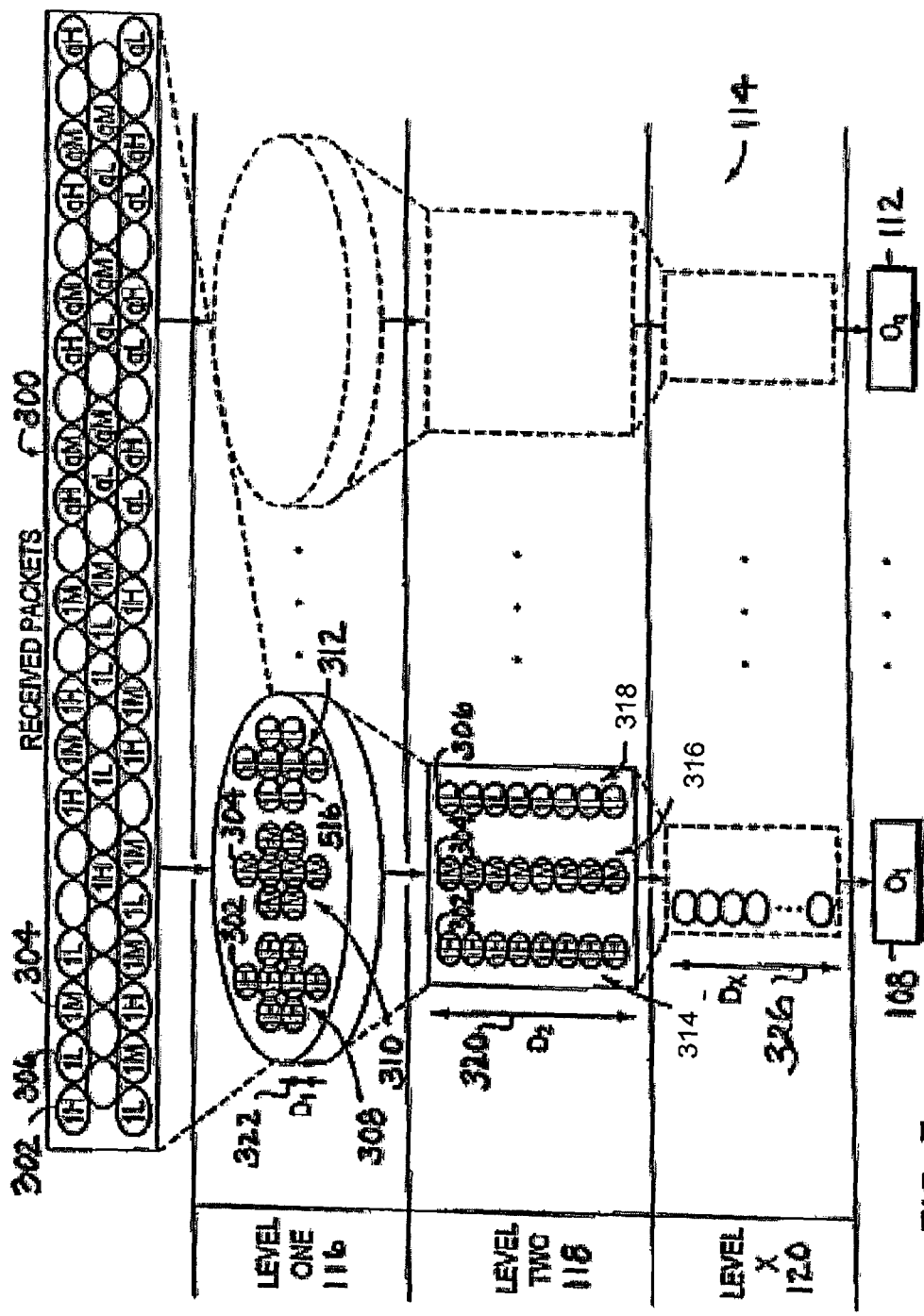
FIG. 3 illustrates the memory, packet, and queue structure of the hierarchical queue system of the network interface card of FIG. 1B.
Figure 4:
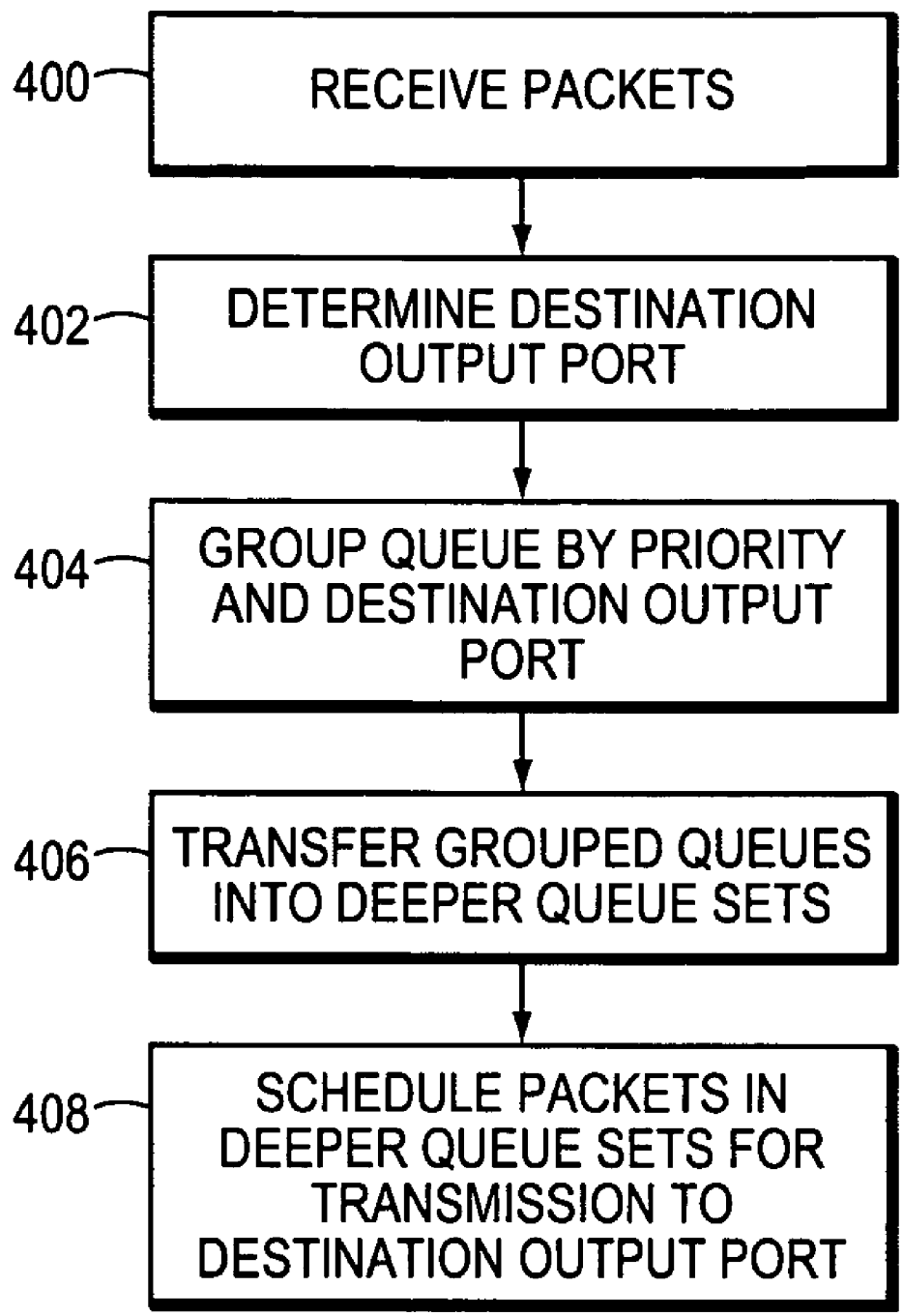
FIG. 4 provides a flow diagram of the steps performed by the dequeue and hierarchical queue system of FIG. 3.

Focusing now on the hierarchical queue system 114 and with reference to FIGS. 3 and 4, the modified packets 300, which are received at the first-level memory or first packet buffer 116 (FIG. 4, Step 400), comprise a plurality of packets having varying priority levels and designated for various output ports (i.e., physical or virtual ports) of the NIC 122. For example, the received packets 300 may include a plurality of high-priority packets 302, medium-priority packets 304, and low-priority packets 306, some of which are destined for output port 108 and others for a second output port 112. The present invention examines the forwarding vectors and the packet header information in the received packets 300 to determine their destination output port 108 (FIG. 4, Step 402). In one embodiment, the destination output port is a physical output port. In another embodiment, the destination output port is a logical output port, and one or more logical output ports are associated with a single physical output port.

In one embodiment, the received packets 300 for a particular output port 108 are organized into groups of queues or priority queue sets (FIG. 4, Step 404) that correspond, for example, to a high-priority queue set 308 (including high-priority packets 302), a medium-priority queue set 310 (including medium-priority packets 304), and a low-priority queue set 312 (including low-priority packets 306). In one embodiment, the queue set is associated with a logical output port. In another embodiment, the queue set is associated with a physical output port that is associated with one or more logical output ports.

The number of priorities associated with a particular output port 108 is typically fixed through all levels of the memory hierarchy. For example, in the present example three priorities are discussed, although it is to be understood that the number of priorities per output port may be defined to be any value, for example, eight. In contrast, the mapping between a particular set or subset of priority levels and a particular set or subset of queues can vary between memory levels. For example, in one embodiment, the communications device features eight priority levels and four queues per output port in the level one memory 116. In this embodiment, priorities 0, 1, and 2 map to queue 0; priorities 3 and 4 map to queue 1; priorities 5 and 6 map to queue 2; and priority 7 maps to queue 4. In this same embodiment, the level two memory 118 has eight queues, with each queue associated with its own priority level. As discussed, in a multi-level memory buffered environment, memory overspeed between different levels enables these priorities to be maintained.

The packets in the first-series priority queue sets 308, 310 and 312 of the first packet buffer 116 are then funneled into second-series priority queue sets 314, 316 and 318 in the second level memory or second packet buffer 118 (FIG. 4, Step 406). The second-series queue sets 314, 316 and 318 are associated with the same output port 108 as the first-series priority queue sets 308, 310 and 312. The second-series queue sets 314, 316 and 318 comprise second-series queues that have a greater buffer depth 320 than the corresponding first-series queues in the first-series queue sets so as to provide deeper buffering at a slower operating rate (and thus enable the use of less expensive memory as the second packet buffer 118). In this context, the term "buffer depth" refers to the maximum amount of packet data that can be stored in a particular queue.

It is important to note that the first packet buffer 116 operates at the aggregate network rate of the communication device and therefore supports a relatively high-speed memory access rate. Further, a sum of the first packet-buffer bandwidths of all of the first packet buffers in the NIC 122 is at least as large as the aggregate network bandwidth of the communication device. This means that the first packet buffer 116 is able to receive packet data in the amount and rate that such data is provided by the communication network. In order to support these operating parameters while remaining non-blocking and output buffered, the first packet buffer 116 uses a wide data bus (to achieve high data rates) and a multiple bank architecture (to achieve high frame rates). The first packet buffer 116 is also relatively shallow (e.g., tens of thousands of packets of storage) so that the first packet-buffer depth 322 of the first-series queues is not very deep. As stated above, the second-series queues have a greater packet-buffer depth 320 (e.g., millions of packets of storage). The second packet-buffer depth is often ten times to one hundred times or more than the depth of the first packet-buffer depth. In general, a sum of the second packet-buffer bandwidths of all the second packet buffers can exceed the sum of the first packet-buffer bandwidths of all the first packet buffers. In other words, the packet-handling capabilities of the second packet buffers (considered in total) are equal to, and may in fact be greater than, the capabilities of the first packet buffers. However, individual second packet-buffer bandwidths are typically less than the aggregate bandwidth of the first packet-buffer bandwidths.

The easing of these performance restrictions as the packets are funneled into deeper queues in the hierarchical queue system 114 enables the use of different memory types for the first and second packet buffers and can thus result in significant cost savings without material performance degradation. Alternatively, the first and second packet buffers can be organized within the same pool of memory and exhibit the same performance characteristics (with just a difference in their buffer depths), but this implementation is not as cost effective. In one embodiment, the hierarchical queue system 114 incorporates more than two levels of packet buffering, such as a level-X memory 120. Similarly, the level-X memory 120 would provide a packet-buffer depth 324 that exceeds the depth 320 of the corresponding second packet buffer. Once the received packets 300 have been funneled down to the lowest level of memory (with the deepest buffer depth), a plurality of dequeuing systems 132, associated with the queues in the packet buffers, schedule the packets for transmission to the destination output port 108 (FIG. 4, Step 408) as discussed in further detail below.

More particularly and as an illustrative embodiment, the first packet buffer 116 receives packets in parallel from all of the NICs of the communication device via the full-mesh interconnect 134. Enqueue engines 136 (FIG. 1B) parse the forwarding vectors to determine whether the received packets are destined for this NIC 122. If the packets are destined for an output port 108, 112 of the NIC 112, the enqueue engines 136 further determine the priority level for the received packets 300 and determine which of the queues (with a consistent priority level) in each memory level of the hierarchical queue system 114 will buffer the received packet. The received packets 300 are then sorted by output port and priority level and grouped into first-series queues in the first packet buffer 116. The packets in the first-series queues are then transferred to corresponding second-series queues in the second packet buffer 118. Enqueue engines 136 again parse the forwarding vectors of the transferred packets to determine particular queues within the second-series priority queue sets that will receive the transferred packets. In one embodiment, there is a one-for-one mapping of queue sets between the first and second packet buffers 116 and 118, respectively. The second packet buffer 118 provides the bulk of the packet buffering of the hierarchical queue system 114 and funnels the packets to the destination output ports 108 and 112 using bandwidth shaping and packet scheduling processes to guarantee service level agreements. Random early detection (RED) and weighted RED (wRED) algorithms may be used at the ingress of the second packet buffer 118 to manage queue congestion.

The funneling effect of reduced memory bandwidth requirements for the level-two and level-X memories 118 and 120 facilitates the implementation of a richer set of QoS mechanisms, controlling such parameters as loss, latency, and jitter.

Referring to FIG. 3, richer QoS mechanisms are provided by permitting the independent configuration of each of the second-series queues 308, 310, and 312 to operate in either a fairness-based mode (e.g., weighted fair queuing) or a priority-based mode (e.g., pure priority) or a combination of both modes. In summary, dequeuing mechanisms (e.g., a distributed scheduler or other scheduling mechanism) service one or more of the second-series queues 308, 310, and 312 configured to operate in a priority-based mode when egress bandwidth is available at the output port 108, 112. If the priority-based queues have no data for transmission or are bandwidth limited, then the dequeue system 132 services the remaining queues configured to operate in a fairness-based mode. In one embodiment, if a priority-based queue receives data for transmission while the dequeue system 132 is servicing a fairness-based queue, the dequeue system 132 will finish servicing the current packet and begin servicing priority-based queues, exhausting the packets in the priority-based queues before servicing a fairness-based queue. In another embodiment, the dequeue system 132 will interrupt the service of the current packet and begin servicing priority-based queues, exhausting the packets in the priority-based queues before servicing a fairness-based queue.

Figure 5:
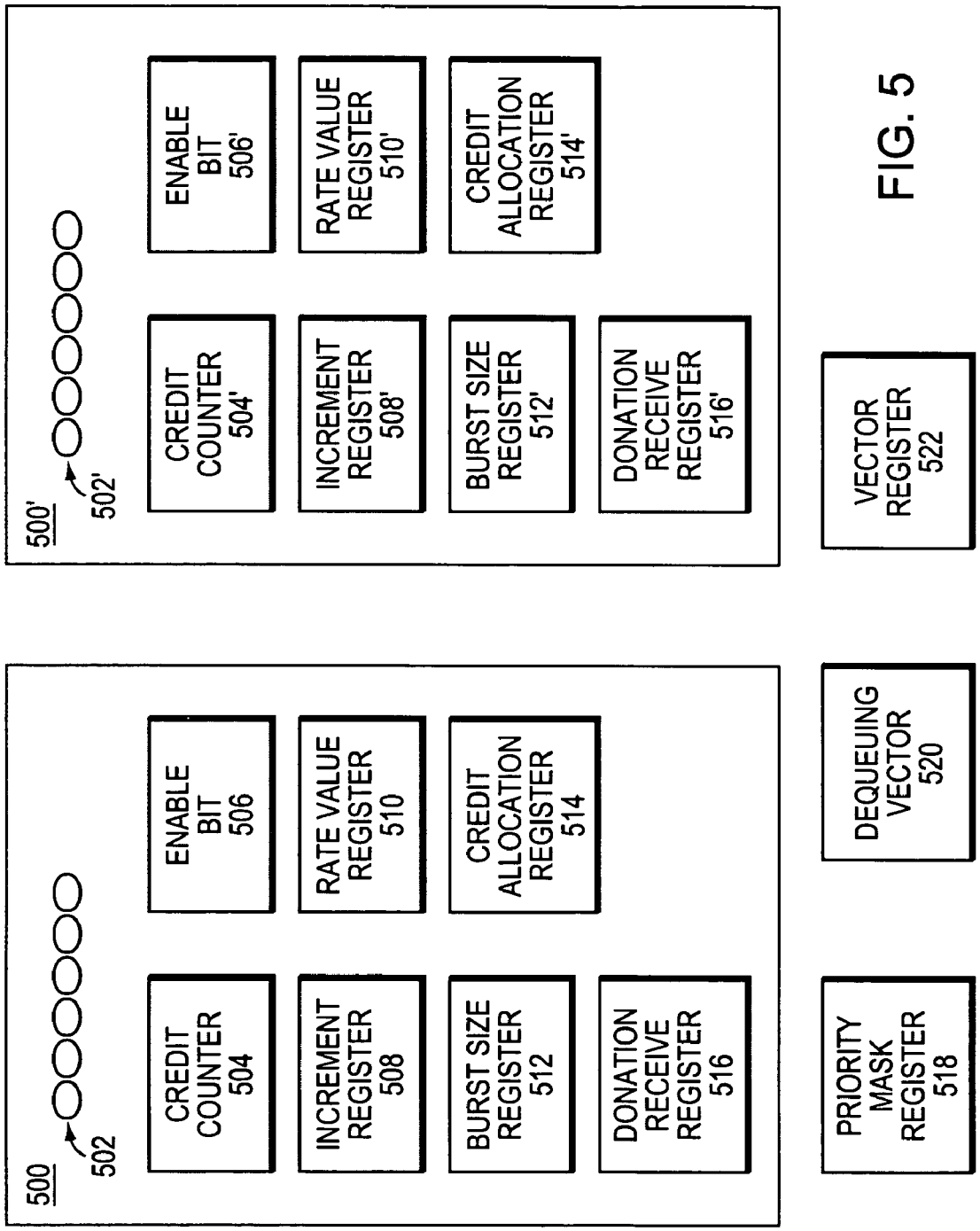
FIG. 5 depicts the configurable queue structure of a queue of FIG. 3 in accord with an embodiment of the present invention.

As illustrated in FIG. 5, each configurable queue 500, 500' (corresponding to a second-level queue 308, 310, 312) either contains or is associated with a set of memory locations that are utilized as storage for configuration parameters that control the transmission behavior of the queues 500, 500'. In one embodiment, the queue 500, 500' and its configuration-determining memory locations are collocated in the same physical or logical memory space. In another embodiment, the queue 500, 500' and its configuration-determining memory locations are dispersed among multiple physical or logical memories.

The configurable queues 500, 500' include storage for one or more data packets 502, 502' received by the communications device. In one embodiment, the queues 550, 550' also include credit counters 504, 504' that are utilized to determine when a queue can participate in an arbitration event. In this embodiment, only those queues configured to operate in a fairness-based mode include or utilize a credit counter 504, 504'. In contrast, priority-based queues are serviced ahead of fairness-based queues whenever they contain data for transmission, obviating the need for credits or credit counters in these queues when a bandwidth constraint does not exist for a priority queue. In another embodiment priority-based queues and fairness-based queues both have credit counters, but the enabling of certain registers disables the operation of the credit counters in the priority-based queues, as discussed below.

In operation the dequeuing mechanism, having first serviced the priority-based queues and transmitted their data, will attempt to service a queue configured to operate in a fairness-based mode. Referring to a particular fairness-based queue 500, if the credits accumulated in the credit counter 504 are less than a predetermined value (e.g., the size of the first data packet 502 for service in the queue) then the dequeuing mechanism will not service the queue. That is, the dequeuing mechanism will not dequeue the packet 502 and does not provide it to the egress bandwidth. However, as time passes the credit counter 504 is typically incremented, meaning that a queue that may not initially be serviced due to a lack of credits for transmission may eventually be serviced. For example, in one embodiment, a credit counter 504, 504' is incremented after the passage of one clock cycle, e.g., every eight nanoseconds on a 125 MHz clock signal. Typically the sum of increments for the credit counters contained in all the queues associated with a particular port is less than or equal to the bandwidth available to that port.

As discussed, in one embodiment priority-based queues do not have credit counters. In another embodiment, an enable bit 506, 506' permits or prohibits the incrementing of credit counter 504, 504'. In this embodiment, completely prohibiting the incrementing of credit counter 504, 504' has the same effect as not having a credit counter at all. Intermittently disabling the incrementing of credit counter 504, 504' has the effect of decreasing either of the rate and the frequency of the increment. If the enable bit 506, 506' is set to a first value, e.g., '1' or logic HIGH, then the credit counter 504, 504' operates as discussed above, accumulating credits with the passage of clock cycles.

In another embodiment, the queue 500, 500' includes an increment register 508, 508'. The increment register 508, 508' specifies the amount of credits by which the credit counter 504, 504' is incremented upon the completion of a recurring event, typically a clock cycle. The register 508, 508' can specify the incremental value in either fractional or integer quantities. This mechanism permits the implementation of weighted fair queuing among queues. For example, a first queue 500 can be configured with an incremental value in a first increment register 508 that is double the incremental value of a second increment register 508' associated with a second queue 500'. Therefore, the first queue 500 will be serviced by the dequeuing mechanism roughly twice as often as the second queue 500', assuming the packets contained in each queue are approximately the same in size.

In another embodiment, proportionately fair queuing is implemented using a rate value register 510, 510' that specifies the rate at which the queue's credit counter 504, 504' is incremented. The discussion above assumes that a credit counter 504, 504' is updated after the completion of a clock cycle. However, nothing prevents the counter from incrementing after every third clock cycle, for example. The rate value register 510, 510' specifies the rate at which the counter 504, 504' is incremented. Considering two queues 500, 500', assuming that packet sizes are approximately equal and that the queue increment registers contain the same value, differences in the update rate in the rate value register 510, 510' permit weighted fair queuing, ensuring that the packets in one configurable queue 500 are accessed and transmitted by a dequeuing mechanism more or less frequently than the packets in the other queue 500'.

In one implementation, the burstiness of packet traffic is controlled by associating each configurable queue with a burst size register 512, 512' specifying a maximum value for the queue's credit counter 504, 504'. In one embodiment, when the burst size register 512, 512' is present or contains a non-zero value, the value in the credit counter 504, 504' is accessed before it is incremented and compared against the value in the burst size register 512, 512'. If the difference between the credit counter value and the burst size register value is less than the incremental value, the credit counter value is either set to equal the burst size register value or left at its current value. In another embodiment, the value in the credit counter 504, 504' is accessed after it is incremented and compared against the value in the burst size register 512, 512'. If the credit counter value exceeds the burst size register value, the credit counter value is either set to equal the burst size register value or reset to its value before it was incremented.

In one embodiment, the communications device implements a proportional fairness algorithm to permit the donation of bandwidth between queues. If one queue 500 lacks data for transmission while a second queue 500' has packets to transmit but insufficient credits in its credit counter 504' to transmit them, proportional fairness permits the donation of credits from the first queue's credit counter 504 to the credit counter 504' of the send queue 500'. In one embodiment, if one queue 500 attempts to increments its credit counter 504 beyond the value specified in burst size register 512, proportional fairness permits the donation of credits from the first queue's credit counter 504 to the credit counter 504' of a second queue 500' whose credit counter value is less than its own specified maximum burst size. In one embodiment, some priority-based queues are ineligible to receive donated credits.

The proportional fairness algorithm is typically implemented in a dequeuing mechanism (e.g., a scheduling component or a distributed scheduler). In one embodiment, each queue participating in proportional fairness includes a credit allocation register 514, 514'. The credit allocation register 514, 514' is a list of entries representative of other queues associated with the same port as the donor queue 500, 500'. In one embodiment, eight queues are associated with a port and the register 514, 514' includes 20 3-bit entries. Each entry in the credit allocation register 514, 514' specifies a queue that can receive a credit donation when the donor queue's credit counter 504, 504' exceeds a maximum value or the donor queue 500, 500' has no data to transmit. By creating repeated entries identifying the same recipient queue, one can disproportionately transfer surplus credits to that queue.

In one embodiment, when a credit counter 504, 504' is incremented and this incrementation either exceeds or would exceed a predetermined maximum value, as discussed above, the queue 504, 504' references the credit allocation register 514, 514' to find a recipient queue for the excess credits. In one embodiment, a pointer in the credit allocation register 514, 514' refers to the last recipient of excess credits; this pointer is incremented to point to the next recipient in the credit allocation register 514 before the next quantity of excess credits is donated. The credit allocation register 514, 514' can be implemented as a circular queue, so that when the end of the register 514, 514' is reached, the process automatically starts over with the first entry in the register 514, 514'. If all of the entries in the register 514, 514' have full credit counters, then any excess credits may be discarded.

In another embodiment, each queue makes the state of its credit counter available to the other queues associated with the port. When a prospective donor queue 500 has excess credits for donation, it examines the entries in the credit allocation register 514 as described above, but examines the state of a potential recipient queue's credit counter 504' before determining a recipient for the excess credits. For example, if a potential recipient queue 500' has a credit counter 504' already at or exceeding its maximum burst value, then the donor queue 500 can simply advance to the next entry in its credit allocation register 514 to locate another candidate for donation.

In still another embodiment, each queue 500, 500' also includes a received donation register 516, 516' that includes entries representative of the other queues associated with a port. For example, in an embodiment where eight queues are associated with a port, the received donation register 516 would have seven entries. When incrementing the credit counter 504 of a queue 500 would exceed a specified maximum value for the credit counter 504, the queue 500 searches for a recipient for its extra credits using the credit allocation register 514 as described above. When a recipient queue 500' is located, the donor queue 500 marks the entry in the received donation register 516 corresponding to the recipient queue 500'. In another embodiment, the amount of credit donated to the recipient queue 500' is recorded.

Arbitration among queues 500, 500' is determined by the priority mask register 518 associated with the port and its associated queues. Each queue associated with the port has a corresponding entry in the priority mask register 518. If the entry is in a first state, e.g., a '1' or logic HIGH state, then the dequeuing mechanism will treat the queue as if it has been configured to operate in a priority mode. If the entry is in a second state, e.g., a '0' or logic LOW state, then the dequeuing mechanism will treat the queue as if it has been configured in a fairness-based mode. The dequeuing mechanism handles the fairness-based and priority-based queues as discussed above.

Typically the queues configured for fairness-based operation are collectively treated as a single group and serviced in a proportionally fair manner. That is, when no priority-mode queue has data to send, this latter group of queues will be serviced. In one embodiment, service of the proportionally fair queues is controlled by a dequeuing vector 520. The dequeuing vector 520 includes multiple entries, each entry representing a queue from the proportionally fair group. When an entry in the vector 520 is selected, packets are retrieved from the corresponding queue and transmitted. In one embodiment, a maximum transfer size register limits the number of bytes that can be retrieved and transmitted from any one proportionally fair queue. By entering repeating entries associated with a single queue in the dequeuing vector, it is possible to disproportionately weight certain queues for service over other services.

In another embodiment, the queue corresponding to the current selected entry in the dequeue vector 520 is serviced until either the credit counter 504, 504' associated with the selected queue lacks sufficient credits to send the next packet, or the value in the maximum transfer size register is reached. In still another embodiment, each new arbitration event begins by servicing the highest priority queue with data for transmission, regardless of the identity of the most recently-serviced queue.

Each queue 500, 500' is associated with a pre-fetch packet buffer. The pre-fetch packet buffer retrieves packets from a lower-level memory and holds them until the queue accumulates sufficient credits in its credit counter 504, 504' to transmit the packet. A byte fairness algorithm is used to maintain fairness among the different memories when selecting packets for loading into the pre-fetch buffers.

In one embodiment, a packet stream between a level N memory and a Level N+1 memory is associated with its own packet memory receive area, referred to here as a connection memory. There may be more than one packet stream between memory levels as packets move from one queue level to another. In one embodiment, each packet stream emanating from a level N memory and received by a level N+1 memory is associated with its own connection memory. Therefore, connection memories provide space to accommodate the queues supported by the level N+1 memory. When more than one connection memory is implemented, a pre-fetch buffer request for a particular queue can be satisfied by any connection memory that has a packet for pre-fetch buffer request for that particular queue.

When the pre-fetch buffer associated with a queue has room for additional packets, a state machine implementing the byte fairness algorithm activates to determine which connection memory will be the source of the next packet. The state machine accepts signals from each memory that indicates the presence or lack of packets for transfer. Using these signals permits the pre-fetch buffer to requests packets from the connection memory and facilitates the operation of the pre-fetch buffer at full capacity and permits line rate processing when a single queue is associated with a port. A memory arbitration component receives these packet requests and selects a winner from all the queues requesting packets from the lower-level memory. In one embodiment, the memory arbitration component chooses successive winners by examining those requesting queues immediately after the most recent winner.

In one embodiment, if the queue selected to provide packets to the egress port (as described above) lacks sufficient packets to drive the port at a specified bandwidth level, then the queue can block requests from the other queues associated with the port. This permits the selected queue to effectively monopolize the packets from the connection memories as long as it controls the port. In another embodiment, the block condition lasts until the selected queue contains sufficient packets to drive the egress port at the specified bandwidth level, whereupon other queues are free to request packets from the connection memories.

To implement the byte fairness algorithm, a set of counters typically equal to the number of memories connected to the pre-fetch buffers is provided. Accordingly, each counter is associated with a connection memory. The counters track the number of bytes supplied to the egress port originating from its associated connection memory.

In one embodiment, the maximum value for the counters is equal to the maximum transmission unit (MTU) size times the number of queues associated with the port. The algorithm assigns this maximum value to each counter upon initialization and when the counters reach a reload condition, as discussed below. When a selected queue is active and providing data to the port, the counters associated with the both the selected queue and any empty queues are decremented. Counters associated with queues having data for transmission that are not currently active are not decremented. By servicing the queue with the highest counter value and decrementing empty queues, the algorithm favors those queues with data for transmission that have waited the longest.

In one embodiment, the counters are decremented by the number of bytes provided by the selected queue. In another embodiment, the counters associated with the empty queues are decremented at a rate that differs from the rate at which the selected queue is decremented. In still another embodiment, the amount by which the queues are decremented is limited to the smallest counter value of the selected group.

In one embodiment, a "virtual zero" threshold for the counters is set at a predetermined value (e.g., 1 MTU). When a counter's value is between true zero and this virtual zero, that queue is disqualified from participation in byte fairness arbitration. Therefore, the data in the queue will remain there and the counter will not be further adjusted until a reload event occurs, as discussed below.

In normal operation, every counter associated with a queue will eventually transition below the virtual zero level. Because of the varying size of individual packets, each counter will typically end up at a different value between true zero and the virtual zero level. After the passage of the last queue below the virtual zero level by virtue of a packet transfer, a reload event occurs and all counters associated with queues are incremented by the MTU level times the number of queues minus 1. Reload events also occur when one queue has a counter below the virtual zero and all the other queues are empty.

Figure 6:
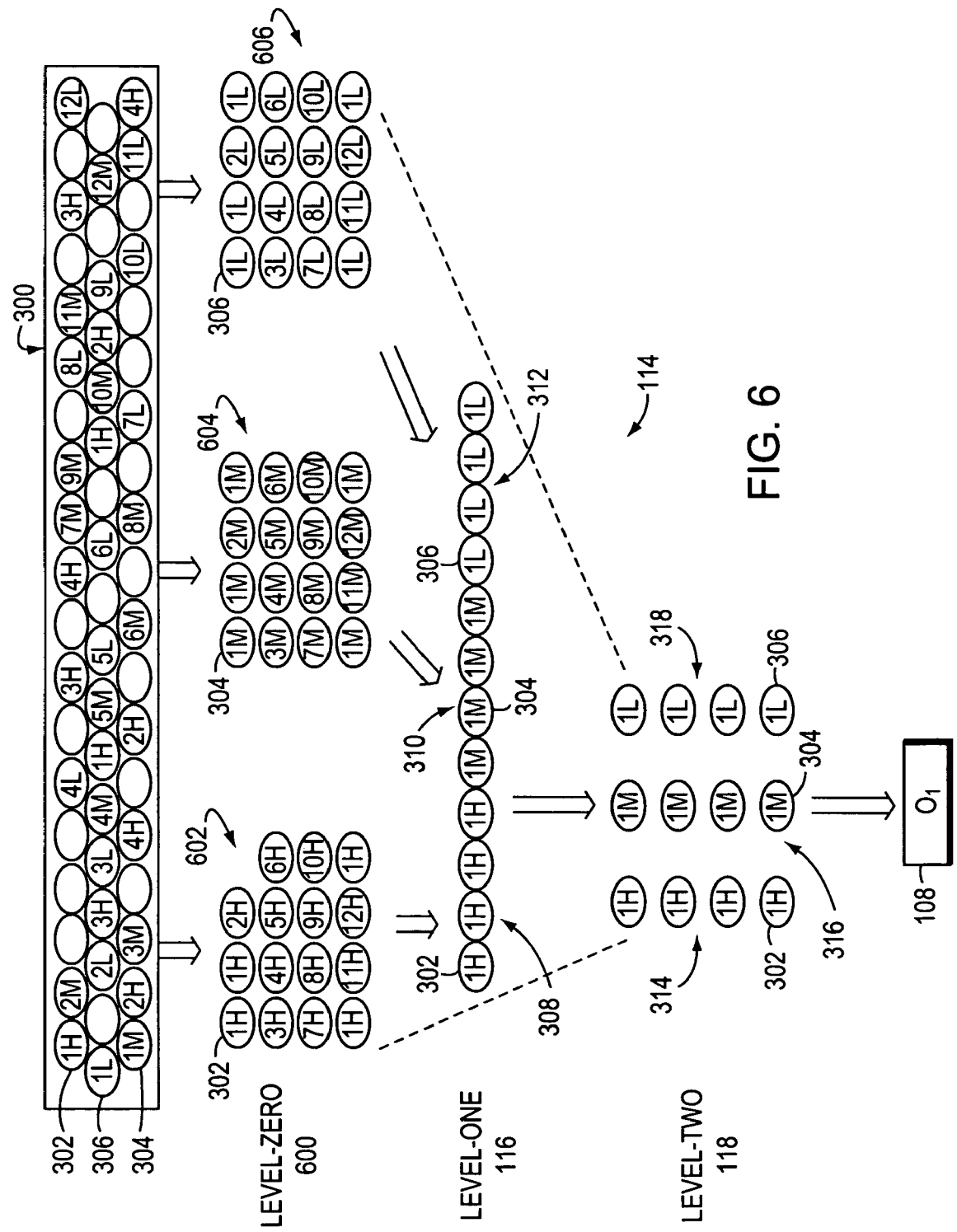
FIG. 6 illustrates the memory, packet, and queue structure of the hierarchical queue system of FIG. 3 when aggregating and buffering queue flows, in accordance with one embodiment of the present invention.

With reference to FIG. 6, the hierarchical queue system 114 can also be used to aggregate packets into queue flows with common forwarding attributes, such as the same QoS or directed at the same communication device. The aggregation of like traffic reduces the burden of managing the large number of queues that can be formed in the lower levels of the hierarchical queue system 114. In other words, as the number of ports in the communication device increase, the resulting number of queues in the hierarchical queue system 114 expands and thus adds to the overall buffering and scheduling complexity in the NIC 122. By presorting the packets received by the communication device into queue flows having the same QoS, the sorting burden on the first-level memory 116 is alleviated, because the first-level memory 116 need only sort through the prioritized queue flows to locate packets destined for the output port 108 associated with the first-level memory 116 rather than sort by both priority level and output port. Thus, the present invention provides a virtual mapping mechanism that maps one or more forwarding vector criteria—e.g., QoS or output port—to each queue. This mechanism can result in mappings, for example, between a single forwarding vector criteria and a single queue, many forwarding vector criteria and a single queue, one forwarding criteria to many queues, and other permutations between forwarding vector criteria and a set or subset of queues.

In one embodiment, the packets 300 received from the communication network reflect a variety of priority levels and are targeted at a plurality of different output ports. A level-zero memory 600 sorts the received packets 300 by priority level into priority queue sets 602, 604, 606 irrespective of their destination output ports. A subset of the packets in the level-zero memory 600 that correspond to a particular output port 108 of the NIC 122 are then transferred to the first-level memory 116, which organizes the packet data into priority queue sets 308, 310, 312 (also associated with port 108) as previously described.

The hierarchical queue system 114 of the present invention has been described in the context of a full-mesh configuration, however, those skilled in the art will recognize that the benefits of the present invention can be realized in other configuration types. In one illustrative embodiment and with reference to FIG. 7, a communication device 700 includes a plurality of instances 702', 702", 702'" of the hierarchical queue system of the present invention. The plurality of instances 702', 702", 702'" are interconnected by a full-mesh interconnect 704. The communication device 700 receives packets from a full-mesh or partial-mesh interconnect 706. Incoming packets enter a level-zero memory 708 and are prioritized/sorted by an enqueue engine 710. The prioritized packets are routed to one of the plurality of instances of the hierarchical queue system 702', 702", 702'" that is associated with a particular destination output port (not shown) of the communication device 700 for which the packets are destined.

If the packets received by the level-zero memory 708 are destined for an output port (not shown) associated with one of a plurality of instances 712', 712", 712'" of a hierarchical queue system in another communication device 714, the level-zero memory 708 will route the packets to a level-zero memory 716 of the communication device 714 via the full-mesh or partial-mesh interconnect 706. The packets will then be prioritized/sorted by enqueue engine 718 and routed to the appropriate hierarchical queue system instance 712', 712", 712'" via the full-mesh interconnect 720.

Figure 7:
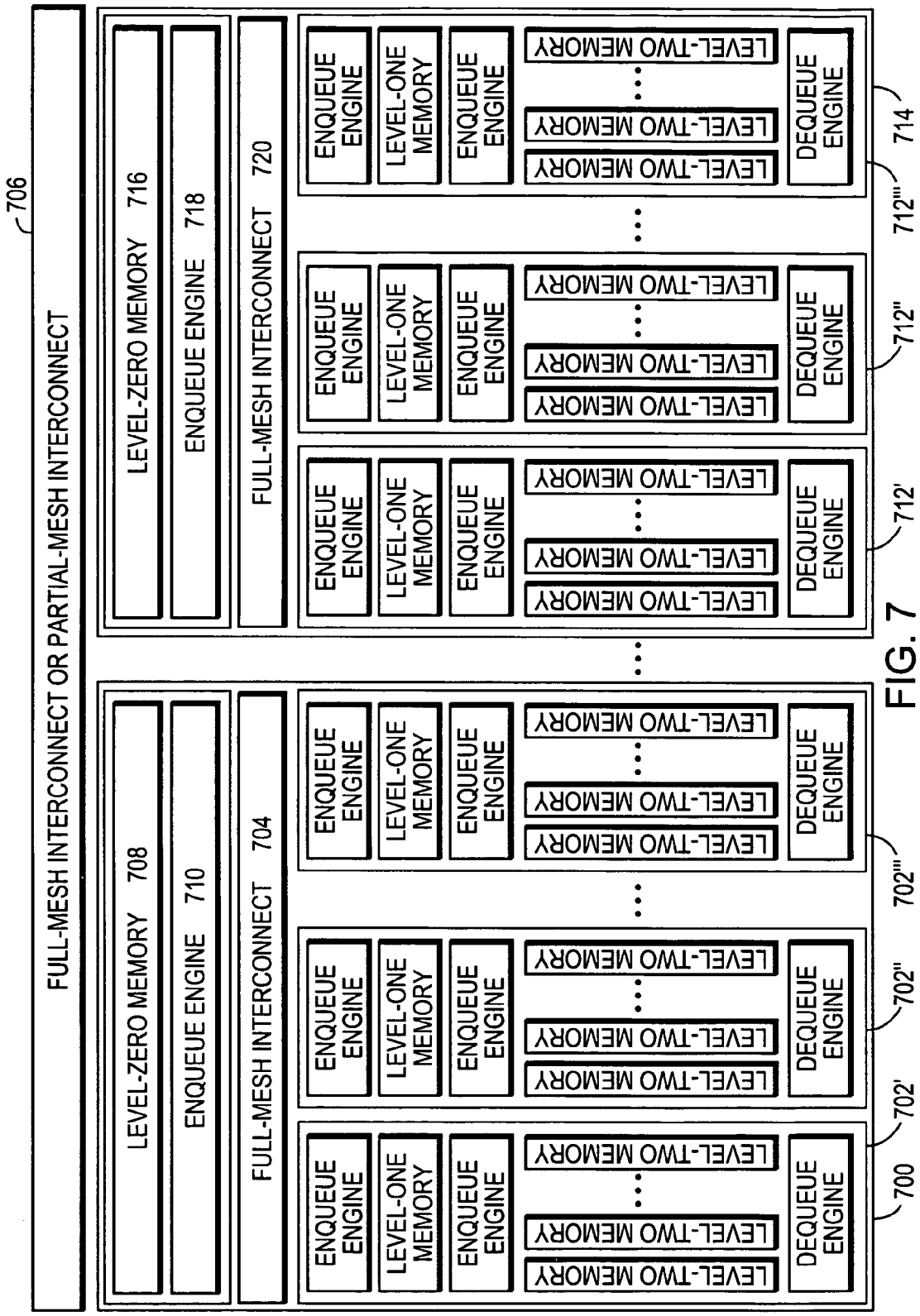
FIG. 7 illustrates an embodiment of the hierarchical queue system in a partial-mesh interconnected system.

The interconnection of the level-zero memory 708, 716 via a partial-mesh interconnect is useful, for example, if the technology limits of the day (i.e., aggregate interconnect speed and level-zero aggregate memory bandwidth) cannot keep up with the aggregate bandwidth of all of the input ports of the system. By contrast, if the technology limits can keep up with the aggregate bandwidth of the input ports of the system, then a full-mesh interconnect could be implemented as shown in FIG. 7.

Many alterations and modifications may be made without departing from the spirit and scope of the invention. Therefore, it is to be understood that these embodiments have been shown by way of example and should not be taken as limiting the invention, which is defined by the following claims. These claims are thus to be read as not only including literally what is set forth by the claims but also to include those equivalents which are insubstantially different, even though not identical in other respects to what is shown and described in the above illustrations.

What is claimed is:

1. A communications device for use on a communications network, the device capable of transferring data packets received at an input port to an output port, the device comprising:
    an input configured to allow specification of first and second configuration parameters, each of said first and the second configuration parameters indicating a queue mode;
    a first configurable queue associated with said first configuration parameter and in communication with said input port and said output port; and
    a second configurable queue associated with said second configuration parameter in communication with said input port and said output port,
    wherein each of said first and second queues is configurable, by each of said first and second configuration parameters, to independently operate in one of a fairness-based mode, wherein a fairness-based queue is serviced when egress bandwidth is available, and a priority-based mode, wherein a priority-based queue with packets for dequeuing is serviced before a fairness-based queue is serviced when priority-based mode dequeuing constraints are met.

2. The device of claim 1 further comprising:
    a dequeuing component in communication with each of said first and second queues and said output port.

3. The device of claim 1 wherein said first queue comprises:
    a first credit counter for tracking credits associated with said first queue,
    wherein said first queue is ineligible for service unless said first credit counter indicates said first queue has sufficient credits for service.

4. The device of claim 3 wherein said second queue comprises:
    a second credit counter for tracking credits associated with said second queue,
    wherein said second queue is ineligible for service unless said second credit counter indicates said second queue has sufficient credits for service.

5. The device of claim 3 wherein said first queue further comprises:
    a first enable bit specifying the state of said first credit counter; and
    a first increment register specifying an incremental value for said first credit counter.

6. The device of claim 4 wherein said second queue further comprises:
    a second enable bit specifying the state of said second credit counter; and
    a second increment register specifying the incremental value for said second credit counter.

7. The device of claim 5 wherein said first queue further comprises:
    a first rate value register specifying the rate at which said first credit counter is incremented.

8. The device of claim 6 wherein said second queue further comprises:
    a second rate value register specifying the rate at which said second credit counter is incremented.

9. The device of claim 3 wherein said first queue further comprises:
    a first burst size register specifying a maximum value for said first credit counter,
    wherein said first credit counter is unable to accumulate credits in excess of said specified maximum value.

10. The device of claim 4 wherein said second queue further comprises:
    a second burst size register specifying a maximum value for said second credit counter,
    wherein said second credit counter is unable to accumulate credits in excess of said specified maximum value.

11. The device of claim 9 wherein said first queue further comprises:
    a first credit allocation register comprising entries indicative of at least one other queue for receiving credits in excess of said first maximum value.

12. The device of claim 10 wherein said second queue further comprises:
    a second credit allocation register comprising entries indicative of at least one other queue for receiving credits in excess of said second maximum value.

13. The device of claim 11 wherein said entries in said first credit allocation register proportionately represent said at least one other queue.

14. The device of claim 12 wherein said entries in said second credit allocation register proportionately represent said at least one other queue.

15. The device of claim 11 wherein said first queue further comprises:
    a first received donation register comprising entries indicative of said received credits from at least one other queue.

16. The device of claim 12 wherein said second queue further comprises:
    a second received donation register comprising entries indicative of said received credits from at least one other queue.

17. The device of claim 1 further comprising:
    a priority mask register associated with said output port comprising entries associated with at least one queue, said entries specifying the operation of said at least one queue in either priority-based mode or fairness-based mode.

18. The device of claim 1 further comprising:
    a dequeuing vector associated with at least one queue operating in a fairness-based mode, said dequeuing vector comprising entries associated with at least one queue.

19. The device of claim 18 wherein said entries in said dequeuing vector proportionately represent said at least one other queue.

20. The device of claim 1 further comprising:
    a vector register comprising a value specifying the maximum amount of data to be provided by a fairness-based queue to its associated output port.

21. A method for routing data packets using a telecommunications device, the method comprising the steps:

configuring a first configurable queue to operate in one of a fairness-based mode and a priority-based mode by specifying a first configuration parameter, the first configurable queue being in communication with an input port and an output port;

configuring a second configurable queue to operate in one of a fairness-based mode and a priority-based mode by specifying a second configuration parameter, the second configurable queue in communication with said input port and said output port;

(b) receiving a packet at said input port;

(c) classifying the packet as subject to one of fairness-based handling and priority-based handling;

(d) assigning said packet to one of said first configurable queue and said second configurable queue operating in a mode corresponding to the handling to which the packet is subject; and (e) causing the queue to which said packet has been assigned to provide said packet to said output port by servicing said identified queue in one of a fairness-based mode and a priority-based mode, as configured.

22. The method of claim 21 wherein the received packet is classified prior to receipt at said input port as subject to one of fairness-based handling and priority-based handling.

23. The method of claim 21 wherein the received packet is not classified prior to receipt at said input port as subject to one of fairness-based handling and priority-based handling.

24. The method of claim 21 further comprising the steps:
(f) providing a plurality of quality-of-service levels for association with packets; and
(g) associating each of said plurality of quality-of-service levels with one of said first configurable queue and said second configurable queue.

25. The method of claim 21 further comprising the steps:
(f) incrementing a first credit counter associated with said first queue;
(g) comparing the value of said first credit counter to a first predetermined value; and
(h) providing said packet in step (e) if the result of said comparison indicates that the value of said credit counter exceeds said first predetermined value.

26. The method of claim 21 further comprising the steps:
(f) incrementing a first credit counter associated with said first queue;
(g) comparing the value of said first credit counter to a first predetermined value;
(h) decrementing said first incremented credit counter if the result of said comparison indicates that said first incremented credit counter exceeds said first predetermined value; and
(i) incrementing a second credit counter.

27. The method of claim 26 wherein step (i) comprises the step:
incrementing said second credit counter by the excess of said first incremented credit counter over said first predetermined value.

28. The method of claim 26 wherein step (i) comprises the step:
incrementing said second credit counter by the amount used to increment said first credit counter.

29. The method of claim 26 further comprising the steps:
(j) accessing a credit allocation register;
(k) retrieving the next entry in said credit allocation register; and
(l) processing said retrieved entry as said second credit counter.

30. The method of claim 21 further comprising the steps:
(f) referencing a priority mask register associated with said output port;
(g) retrieving an entry in said priority mask register defining the operational state of said first configurable queue as one of a fairness-based mode and a priority-based mode; and
(h) retrieving an entry in said priority mask register defining the operational state of said second configurable queue as one of a fairness-based mode and a priority-based mode.

31. The method of claim 21 wherein step (f) comprises the steps:
(e-1) servicing said identified queue in a priority-based mode;
(e-2) iterating step (e-1) until said identified queue is emptied of packets or a predetermined transmission criteria is satisfied.

32. The method of claim 31 further comprising the steps:
(f) incrementing a first credit counter associated with said first queue;
(g) comparing the value of said first credit counter to a first predetermined value;
(h) decrementing said first incremented credit counter if the result of said comparison indicates that said first incremented credit counter exceeds said first predetermined value; and
(i) incrementing a second credit counter.

33. The method of claim 32 wherein step (i) comprises the step:
incrementing said second credit counter by the excess of said first incremented credit counter over said first predetermined value.

34. The method of claim 32 wherein step (i) comprises the step:
incrementing said second credit counter by the amount used to increment said first credit counter.

35. The method of claim 32 further comprising the steps:
(j) accessing a credit allocation register;
(k) retrieving the next entry in said credit allocation register; and
(l) processing said retrieved entry as said second credit counter.

36. The method of claim 31 further comprising the step:
(e-3) iterating steps (e-1) and (e-2) for all remaining queues configured to operate in a priority-based mode; and
(e-4) servicing a queue configured to operate in a fairness-based mode until a queue configured to operate in a priority-based mode requires servicing.

37. A method for routing data packets using a telecommunications device, the method comprising the steps of:
(a) configuring at least one first queue of a plurality of configurable queues to operate in fairness-based mode by specifying at least one configuration parameter;
(b) configuring at least one second queue of a plurality of configurable queues to operate in priority-based mode by specifying at least one other configuration parameter;
(c) dequeuing a packet from said at least one second queue while said at least one second queue has remaining packets; and
(d) dequeuing a packet from said at least one first queue while said at least one second queue has no remaining packets.

* * * * *